Patented Dec. 4, 1928.

1,693,917

UNITED STATES PATENT OFFICE.

ALFRED EISENSTEIN, OF SCHRECKENSTEIN, NEAR AUSSIG-ON-THE-ELBE, CZECHO-SLOVAKIA, ASSIGNOR OF ONE-HALF TO GEORG SCHICHT A.-G., OF AUSSIG-ON-THE-ELBE.

PROCESS FOR THE MANUFACTURE OF LINOLEUM COVERING MATERIAL.

No Drawing. Application filed March 13, 1925, Serial No. 15 381, and in Czechoslovakia January 16, 1925.

For the manufacture of linoleum mass tedious procedures have hitherto been used. Firstly varnish must be converted by oxidation into linoxyn, which then is melted together with resin to form a cement. The latter is combined with cork, wood and various mineral colors by repeated mixing and disintegrating processes, and the final product obtained in this way constitutes the linoleum mass.

Because of this laborious and expensive mode of operation, numerous attempts at simplification have been made. Thus Hertkorn in his German Patent No. 100,917, of the 7th December, 1898, has already suggested mixing varnish with cork, wood flour and resin, (that is, without mineral colors), exposing the mixture in a stirring machine to the influence of cold or hot air, or oxygen gas, the temperature however never being allowed to rise above 70° C. Hertkorn's process almost inevitably involves the danger of the material becoming carbonized or spontaneously igniting. Also the Hertkorn process suffers from the disadvantage that as regards the mixing proportions one is limited by the intended composition of the linoleum mass.

A further step in advance is the process according to Austrian Patent No. 92,404, of the 15th September, 1922, according to which the varnish is exposed on the other (pulverulent) constituents of the linoleum mass, that is, cork meal, filling substances and mineral colors, to the oxidizing influence of the air. This process however is very uncertain, because in order to prevent unexpected rises of temperature, which might lead to carbonization, a certain amount of care is still necessary. While the manufacture of linoleum mass is accelerated by this process, as compared with the earlier methods, it also requires a long time.

Now I have discovered that the duration of the process, with complete safety of operation, can be considerably shortened if the following precautions are taken.

(1) The oxidation is greatly expedited if the mixture is in a powdered or pulverulent state so that a small addition of the liquid constituent, i. e., oil or varnish, will cause a balling or agglomeration. This condition is present, when the liquid and the dry constituents are mixed in the proportion corresponding to the proportion required for the final composition of the linoleum mass. In the majority of instances, however, this will not be the case for it will happen that the mixture cakes together, that is, from the pulverulent state assumes a dough like state, if the ultimate mixing proportions were adopted. Thus, in order to obtain the above mentioned condition, part of the oil or of the varnish must be omitted. In other cases the mixture would indeed be pulverulent, but the addition of a small quantity of varnish would still not effect the agglomeration. In such a case part of the pulverulent constituents is omitted. In these cases just referred to the oxidation therefore is first carried out with an incomplete mixture. The initial mixing proportions are independent of the fineness of the dry constituents and of the degree of fluidity of the liquid constituents.

(2) A second important factor of the present process is that the heat of reaction liberated during the oxidation of one part is utilized in order to bring fresh mixture up to the reaction temperature. This is accomplished by the addition of fresh mixture while the oxidation occurs. Thus, this fresh mixture, in absorbing the heat of reaction, exerts a cooling action on the already partially oxidized mass thus preventing the oxidation from going too far, which might lead to carbonization, or even to spontaneous ignition.

(3) The measures described sub (1) and (2) permit of the reaction being carried out at comparatively high temperatures as one has it in one's power to prevent the selected temperature from being exceeded by the addition of constituents that have so far been withheld, or to maintain the temperature when once selected by the addition of further quantities of the mixture to be oxidized, whereby again the speed of reaction is greatly accelerated.

The result of combining the measures described sub (1) and (2) or subs (1) and (3), or all three measures, is that the oxidation of the linseed oil, or of the varnish as the case may be, which would otherwise require many hours or days even, can be carried out in almost as many minutes.

This speed of oxidation makes it possible, to work, if required, even without a siccative, that is with ordinary linseed oil, or some other more or less good drying oil. Even previously treated oil e. g. neutralized or pre-oxidized oil, or even polymerized oil may be employed.

*First example.*—32 kilogrammes of varnish are mixed with 30 kilogrammes of cork, 10 kilogrammes of mineral color and 8 kilogrammes of pulverized resin, raised to a temperature of 120° C. in a heatable mixing machine of any desired construction and the mixture is exposed to oxidization by air. As soon as the reaction is in progress, 10 kilogrammes of cork and 10 kilogrammes of lithopone are added. These absorbing the heat of reaction exert a cooling action. The apparatus is there emptied.

*Second example.*—In 32 kilogrammes of varnish are dissolved by heating 8 kilogrammes of resin required for 100 kilogrammes of linoleum mass. Of the 40 kilogrammes of varnish and resin mixture thus obtained, 30 kilogrammes are mixed with 40 kilogrammes of wood flour and 20 kilogrammes of mineral color. This mixture is brought to oxidation at 150° C. in a mixing apparatus. As soon as the oxidation is in progress the heating is discontinued, then 5 kilogrammes of the mixture of varnish and resin are added, and after a few minutes, as soon as the oxidation, which at first somewhat slackened, has regained its full force, the remaining 5 kilogrammes are added. The heat of reaction liberated by the last oxidation stage is now absorbed by the addition of 10 kilogrammes of a complete mixture of varnish, resin, wood flour and mineral colors. The heat of reaction suffices to oxidize the 3.2 kilogrammes of varnish contained in the last 10 kilogrammes. The fresh heat of reaction produced is however not great enough to appreciably warm the entire mass present in the apparatus.

*Third example.*—In a mixing machine, in which a maximum of 500 kilogrammes of material can be simultaneously oxidized, 200 kilogrammes of varnish in which 50 kilogrammes of resin are dissolved are mixed with 187.5 kilogrammes of cork and 62.5 of mineral color and exposed at 140° C. to the oxidization of the air. As soon as the oxidization has attained the desired degree, which is to be ascertained by the fact that a test taken, upon pressure, no longer yields any oil, 50 kilogrammes of material are taken out of the apparatus and quickly cooled by being spread on the floor. At the same time 50 kilogrammes of unoxidized mixture are added to the composition in the apparatus, so that its maximum capacity is again attained. These added 50 kilogrammes are brought up to the reaction temperature by the heat of reaction contained in the residual 450 kilogrammes and oxidized at this temperature, whereupon the procedure can be repeated as many times as may be desired which means a continuous process and a uniform product. With the material taken out of the apparatus are finally mixed sufficient cork and lithopone to bring the mixture up to the desired proportions of 32 per cent varnish, 8 per cent resin, 40 per cent cork and 20 per cent mineral colors.

What I claim is:—

1. The process of producing linoleum mass, which consists in mixing together the liquid and solid constituents in a proportion in which they are pulverulent, subjecting the mixture to oxidation at a temperature above 70° C. but below the temperature of carbonization, and maintaining said temperature and the pulverulent condition of the mixture.

2. The process of producing linoleum mass, which consists in mixing together the liquid and solid constituents in a proportion in which they are pulverulent, subjecting the mixture to oxidation at a temperature above 70° C. but below the temperature of carbonization, maintaining said temperature by controlling the temperature of reaction and maintaining the pulverulent condition of the mixture.

3. The process of producing linoleum mass, which consists in mixing together the liquid and solid constituents in a proportion in whch they are pulverulent and do not cake together, subjecting the mixture to oxidation at a temperature above 70° C. but below the temperature of carbonization, and maintaining said temperature by removing a portion of said mixture, and adding fresh unoxidized mixture of substantially the same proportions as the original mixture.

4. The process of producing linoleum mass, which consists in mixing together an unoxidized oil with suitable solid constituents in a proportion in which they are pulverulent, subjecting the mixture to oxidation at a temperature above 70° C., but below carbonization temperature, and maintaining said temperature and the pulverulent condition of the mixture.

5. The process of producing linoleum mass, which consists in mixing together an unoxidized oil with suitable solid constituents in a proportion in which they are pulverulent, subjecting the mixture to oxidation at a temperature above 70° C., but below carbonization temperature, and maintaining said temperature by controlling the temperature of reaction and the pulverulent condition of the mixture.

6. The process of producing linoleum mass which consists in mixing together an unoxidized oil with suitable solid constituents in a proportion in which they are pulverulent and do not cake together, while omitting from the mixture a part of the constituents, subjecting the mixture to oxidation at a temperature above 70° C., but below carbonization temperature, and maintaining said temperature by adding the part of the constituents originally omitted from said mixture.

7. The process of producing linoleum mass, which consists in mixing together an unoxidized oil with suitable solid constituents in a proportion in which they are pulverulent and do not cake together, subjecting the mixture to oxidation at a temperature above 70° C., but below carbonization temperature, and maintaining said temperature by removing a portion of said mixture, and adding fresh unoxidized mixture of substantially the same proportions.

8. In the process of producing linoleum mass, the step of oxidizing a drying oil in pulverulent admixture with the other constituents ordinarily entering into the composition, and maintaining a regulated temperature above 70° C., but below carbonization temperature and the pulverulent condition of the mixture.

9. The process of producing linoleum mass, which consists in mixing together the liquid and solid constituents in a proportion in which they are pulverulent and do not cake together, subjecting the mixture to oxidation at a temperature above 70° C. but below carbonization temperature, and maintaining said temperature by removing a portion of said mixture and adding fresh unoxidized mixture of substantially the same proportions as the original mixture.

10. The process of producing linoleum mass, which consists in mixing together unoxidized oil and the solid constituents in a proportion in which they are pulverulent, exposing the mixture to the action of an oxidizing agent and controlling the temperature at the same time maintaining the mixture in a pulverulent condition.

11. The process of producing linoleum mass, which consists in mixing together an unoxidized oil with the solid constituents in a proportion in which they are pulverulent, subjecting the mixture to oxidation at a temperature above 70° C. but below carbonization temperature, and maintaining said temperature by controlling the temperature of reaction and also maintaining the pulverulent condition of the mixture.

12. The process of producing linoleum mass, which consists in mixing together an unoxidized oil with the solid constituents in a proportion in which they are pulverulent and do not cake together, subjecting the mixture to oxidation at a temperature above 70° C. but below carbonization temperature, and maintaining said temperature by removing a portion of said mixture and adding fresh unoxidized mixture of substantially the same proportions as the original mixture.

13. The process of producing linoleum mass, which consists in mixing together the liquid and solid constituents in a proportion in which they are pulverulent, while maintaining the mixture in a pulverulent condition, subjecting the mixture to oxidation at a temperature above 70° C., but below the temperature of carbonization, and adding pigments to said mixture.

14. The process of producing linoleum mass, which consists in mixing together an unoxidized oil with the solid constituents in a proportion in which they are pulverulent, exposing the mixture to the action of oxygen containing gases at a temperature above 70° C. but below carbonization temperature and the pulverulent condition of the mixture, maintaining said temperature, and adding pigments to said mixture.

In testimony whereof I affix my signature.

Dr. ALFRED EISENSTEIN.